United States Patent [19]

Choi

[11] Patent Number: 5,560,389

[45] Date of Patent: Oct. 1, 1996

[54] PRESSURE REDUCING VALVE DEVICE FOR A VEHICLE

[75] Inventor: Cham-Gil Choi, Ulsan, Rep. of Korea

[73] Assignee: Hyundai Motor Company, Ltd., Seoul, Rep. of Korea

[21] Appl. No.: 422,914

[22] Filed: Apr. 17, 1995

[51] Int. Cl.⁶ ............................................. F16K 31/44
[52] U.S. Cl. .......................... 137/354; 251/234; 251/238
[58] Field of Search ............................... 251/234, 238; 137/354

[56] References Cited

U.S. PATENT DOCUMENTS

| | | | |
|---|---|---|---|
| 1,872,083 | 8/1932 | Hutchison | 251/234 |
| 2,013,439 | 9/1935 | Gauger | 251/238 |
| 2,022,511 | 11/1935 | Lewis | 251/234 |
| 2,953,391 | 9/1960 | Whelan | 251/234 |

*Primary Examiner*—A. Michael Chambers
*Attorney, Agent, or Firm*—Birch, Stewart, Kolasch & Birch, LLP

[57] ABSTRACT

A pressure reducing valve device includes an adjusting spring for changing its length by a first screw member and a valve stem rotatable by a second screw member so as to control a spring ratio, and a load sensing reducing valve movable on a bracket so as to align a piston with the valve stem by a third screw member whereby the pressure reducing valve device controls a fluctuating width of dynamic characteristics so as to match with an ideal braking line of any of an empty, loaded and surplus loaded vehicle.

4 Claims, 3 Drawing Sheets

PRESSURE REDUCING VALVE DEVICE FOR A VEHICLE

BACKGROUND OF THE INVENTION

1. Field of the Invention

The present invention relates to a pressure reducing valve device for a vehicle and more particularly, to an improved reducing valve device for sensing a load of a vehicle, which controls a fluctuating range of dynamic characteristics.

2. Description of the Related Art

Various types of pressure reducing valve devices for a vehicle are known in the art. Generally, a load controlling reducing valve (hereinafter "LCRV") is utilized in a freight vehicle such as a luggage van which is loaded with goods. The LCRV is connected to a master cylinder and a wheel cylinder of a real brake so as to change a hydraulic ratio of front and rear brakes depending on the load carried on the vehicle, and is operated by an axle face for the load.

The direct result of the LCRV is to weaken the braking force of the rear brake so as to prevent the rear wheels from generating a spin phenomenon since during driving a freight vehicle with goods, when the vehicle is braked, first of all, the rear brake is locked in opposition to the front brake due to the concentration and load carried on the front brake.

As shown in FIG. 3, the conventional LCRV 31 is fixed to a bracket 33 fixed to a chassis frame 32 and is provided with an adjusting spring 34 for link moving resiliency between an axle face 35 and the bracket 33. If the carried load increases, the axle face 35 rises up to a dotted line (FIG. 3). At this time, the chassis frame 32 correspondingly moves down.

Accordingly, the valve stem 36 attached to the top portion of the adjusting spring 34 applies a force F2 to a piston 37 of the LCRV 31 (FIG. 4). As shown in FIG. 4, a sleeve 39 of the piston 37 receives a force F1 which is internally generated by the spring 34 and rises up to the side of a piston sleeve 40. A valve plate 41 disposed on top of the piston 37 operates to open a ball valve 42 of the piston sleeve 40 for inducing oil from the master cylinder. The oil operates the wheel cylinder of the rear brake through an outlet 44 in a lowered state of the oil pressure during passing through the ball valve 42, the piston sleeve and an inlet 43. Therefore, the rear brake has a time difference and a pressure difference compared with those of the front brake.

FIGS. 5(A), 5(B), 5(C) and 5(D) illustrate an actual or real braking line shown in the dotted line and an ideal braking curved line shown in the hard curved line. The ideal braking line means a brake oil pressure line. As shown in FIGS. 5(A), 5(B), 5(C) and 5(D), the hard curved line crossing with the dotted real braking line at a point is an ideal braking line (KERB) of an empty car, with the dotted real braking line at B point is an ideal braking line (GUW) of a loaded car, and the dotted real braking line at C point is an ideal braking line (O/L) of a surplus loaded (100%) car.

As shown in FIGS. 5(A), 5(B), and 5(C), upon comparing the real braking line and the ideal braking line, it shows that both lines are quite different from each other. In other words, the rear brake has a locking occurrence at a point except the points A, B and C. In order to eliminate the above problems, the LCRV is utilized with the car. However, even if at each loading state of the car, all states meet with the real braking line, the crossing points do not align with a setting value of all loaded states of the car. That is, the conventional LCRV 31 has a certain width of dynamic characteristics depending on the loaded weight such as empty, loaded and surplus loaded states, so that the conventional LCRV 31 cannot be used in a car which has various types of loading sources.

FIG. 5(D) illustrates a model of ideal braking lines PC-KERB, PC-GUW and PC-O/L which are close to the ideal braking curved line by using an LCRV 1 of the pressure reducing valve device according to the present invention. However, as shown in FIGS. 5(A), 5(B), and 5(C), the width of the PC value is very narrow when the conventional LCRV 31 is applied to a car which has various types of loading sources so that it is difficult to determine a proper value of PC-KERB, PC-GUW and PC-O/L.

The width of the PC value is to be determined by a spring ratio under the application of the LCRV and is expressed as follows:

$$PC = K + \frac{F_S}{A_2} + \frac{(D-x) \times S_C \times S_R \times Z}{A_2}$$

Where K is a friction load pressure and $F_s/A_2$ is a load pressure $F_1$ of the spring 38, and $K+F_s/A_2$ is a coefficient and does not relate to the change of the PC value, (D−x) relates to the $F_2$ value of the car load, $S_c$ is a spring ratio, $S_R$ is a spring rate, and Z is a coefficient of efficiency of the bracket 33.

As shown in the above expression, since the changing size of the PC value depends on $S_c \times S_R \times Z$, and if the value size of $S_c$ is changed, the width of the PC value is controlled, the best ideal braking line of the dynamic characteristics of the load sensing reducing valve 1 of the pressure reducing valve device for a vehicle is invented by the present inventor as the present invention.

SUMMARY OF THE INVENTION

Accordingly, it is an object of the present invention to provide a pressure reducing valve device for a vehicle, which eliminates the above problems encountered with conventional pressure reducing valve devices for a vehicle.

Another object of the present invention is to provide a pressure reducing valve device including an adjusting spring for changing its length by a first screw member and a valve stem for rotation by a second screw member so as to control a spring ratio, and a load sensing reducing valve movable on a bracket so as to align a piston with the valve stem by a third screw member whereby the pressure reducing valve device controls a fluctuating width of dynamic characteristics so as to match with an ideal braking line of an empty, loaded and surplus loaded vehicle.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
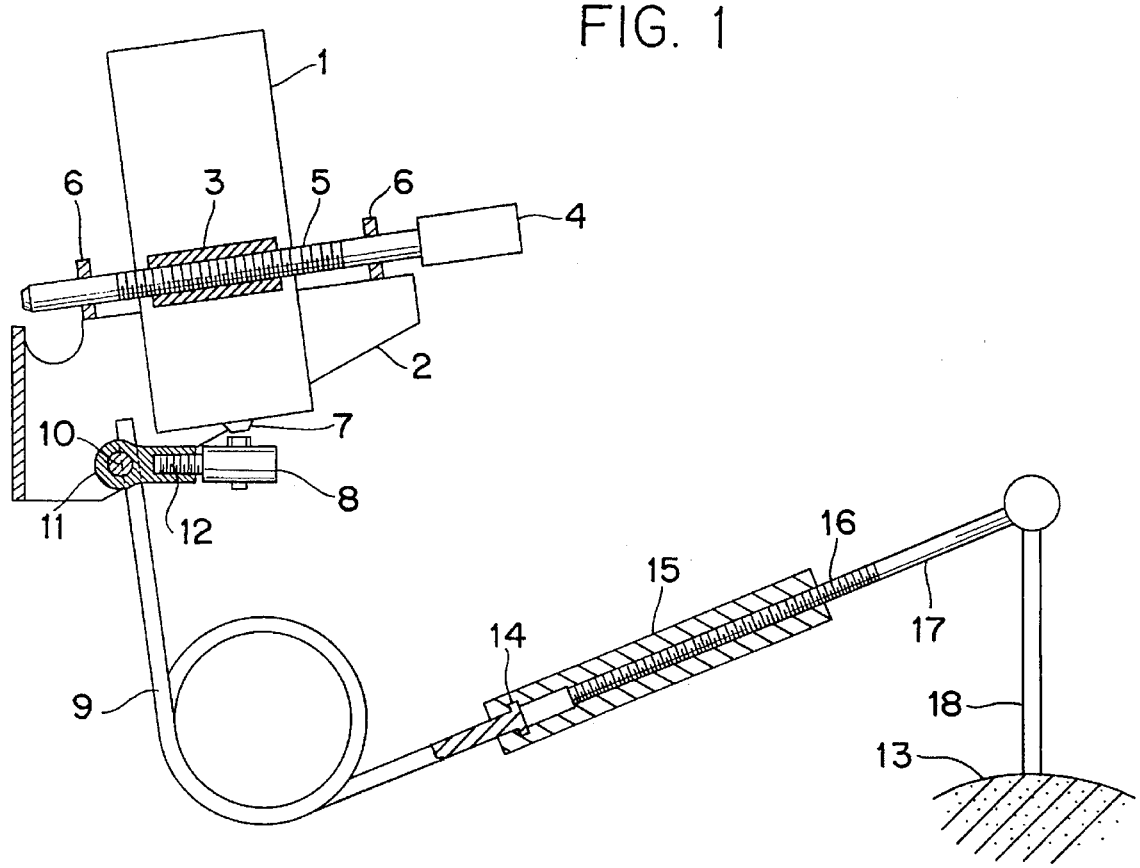
FIG. 1 is a somewhat diagrammatic side view of a pressure reducing valve device for a vehicle according to the present invention containing cut-away portions in order to illustrate the construction of the device of the present invention.
Figure 3:
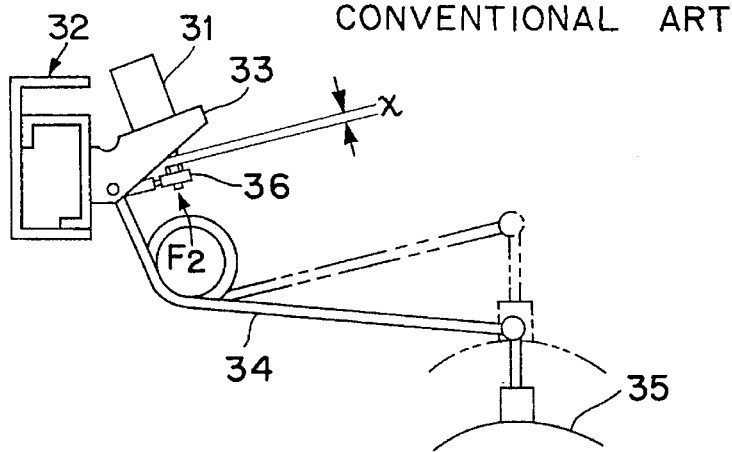
FIG. 3 is a somewhat diagrammatic side view of a conventional pressure reducing valve device for a vehicle.
Figure 2:
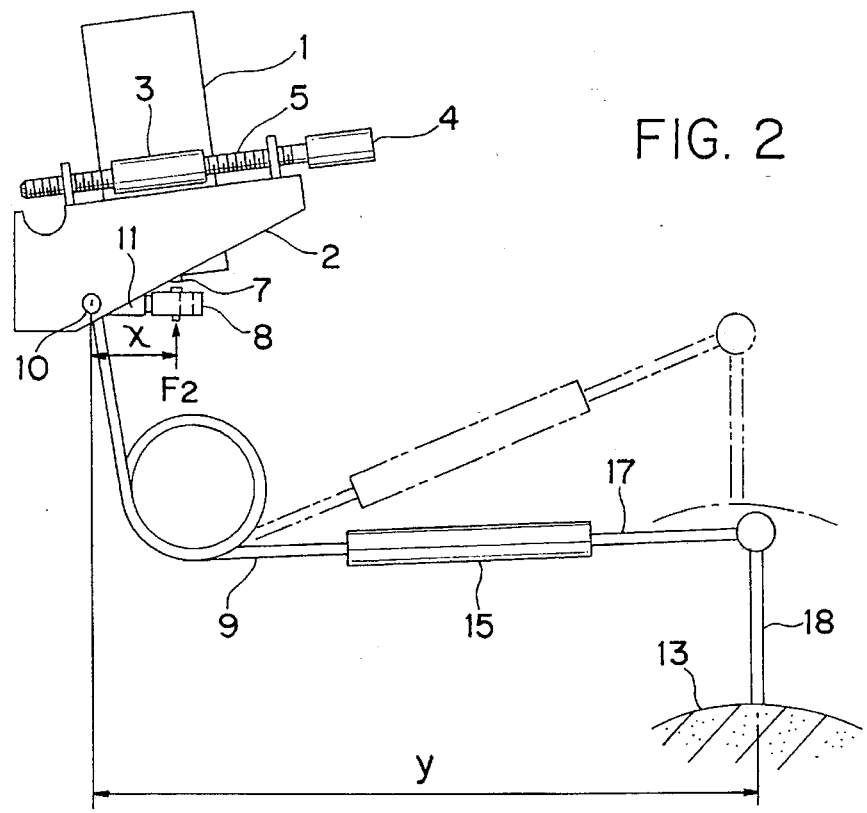
FIG. 2 is a somewhat diagrammatic side view of the pressure reducing valve device for a vehicle according to the present invention showing an operation thereof.

Referring now in detail to the drawings for the purpose of illustrating preferred embodiments of the present invention, the pressure reducing valve device for a vehicle as shown in FIGS. 1 and 2, comprises a first female screw 3 for supporting a load sensing reducing valve 1 at the center portion of a bracket 2 which is fixed to a chassis frame of a rear axle side of the vehicle.

The first female screw 3 welded or fixed to a side face of the load sensing reducing valve 1 is threaded with a first male screw 5 which is attached to a handle 4 and is able to rotate by itself. The first male screw 5 is rotatably seated on a pair of male screw seats 6 extending from both sides of the bracket 2. Therefore, when the handle 4 is rotated in any one direction, the first female screw 3 acts a rectilinear movement so that a piston 7 moves in any one direction, forwardly or backwardly.

The piston 7 is operatively associated with a valve stem 8. The valve stem 8 is provided with a male screw part 12 attached to one side thereof and is threaded with a female screw part 12'. The female screw part 12' is disposed in a rotary arm 11. The rotary arm 11 is rotatably connected to an arm shaft 10 which is fixed to the top portion of an adjusting spring 9 (FIG. 1).

Therefore, when the valve stem 8 is rotated in any one direction, the valve stem 8 is far away from or is near to the arm shaft 10 since the male screw part 12 comes out of or inserts into the female screw part 12'.

The valve stem 8 applies a force $F_2$ depending on the carrying load to the piston 7. However, this matter is really accomplished by the adjusting spring 9. The adjusting spring 9 transforms resiliently between the arm shaft 10 and the axle face 13 by a pressing pressure of the bracket 2. The pressing pressure comes from the carrying load to the axle face 13.

Figure 4:
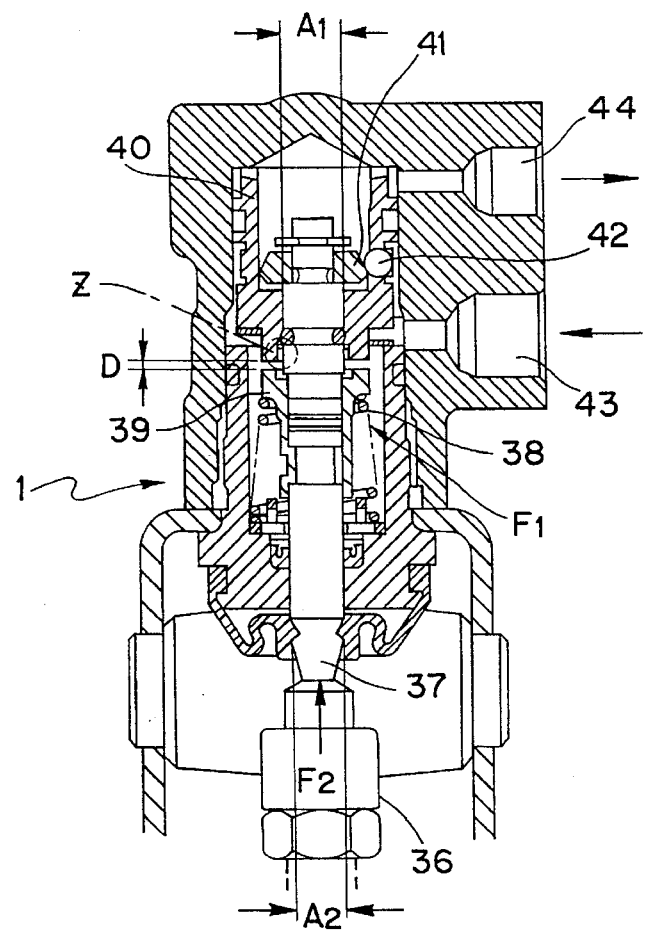
FIG. 4 is a sectional view of a conventional load sensing reducing valve.

As shown in FIG. 4, the relation of the force $F_2$ and the spring ratio $S_c$ will be described hereinafter in detail because the adjusting spring 9 controls the spring ratio $S_c$ in the present invention.

$$PA_1 = P(A_1 - A_2) + F_1 + F_2.$$

In the above expression, if a friction resistance K' is considered, $$PA_2 = F_1 + F_2 + K'$$

and $$P = \frac{F_1}{A_2} + \frac{F_2}{A_2} + \frac{K'}{A_2}.$$

Figure 5A:
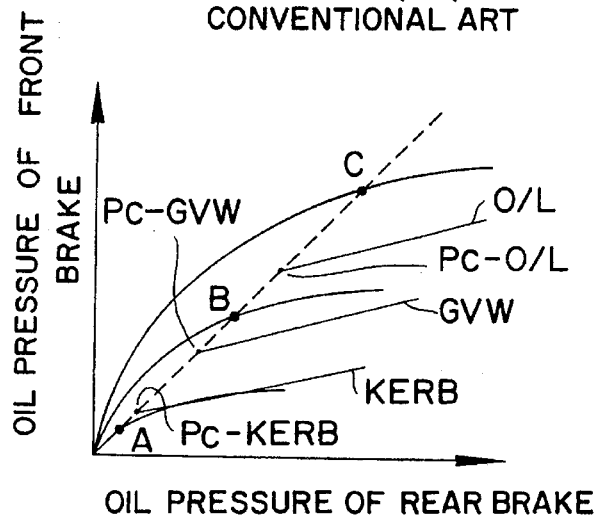
FIGS. 5(A), 5(B) and 5(C) graphically show conventional dynamic characteristic lines.
Figure 5B:
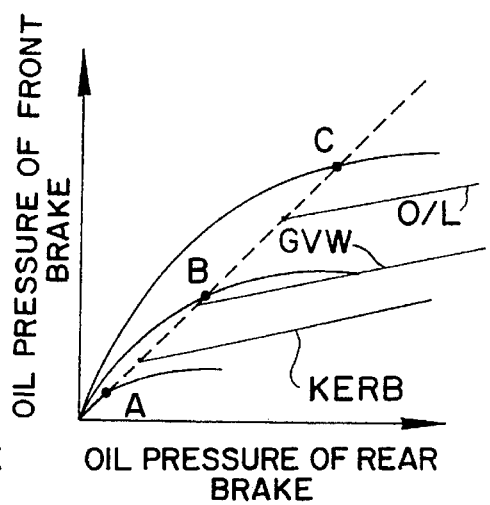
Figure 5C:
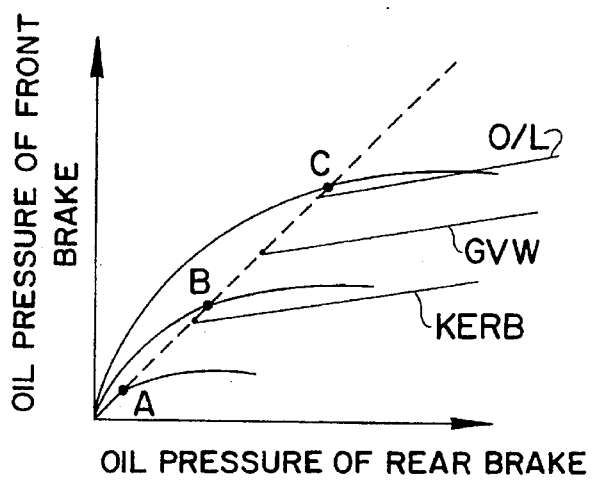
Figure 5D:
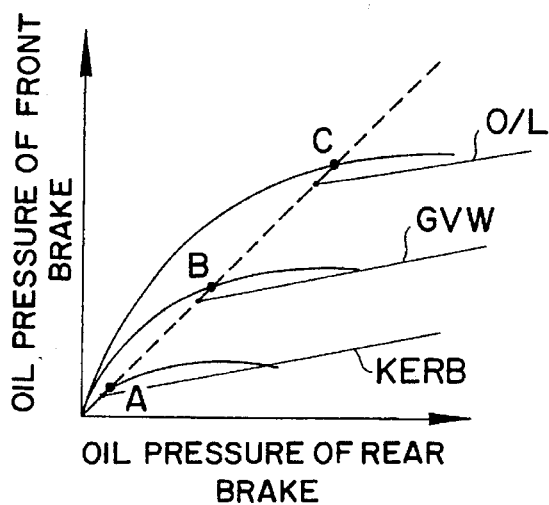
FIG. 5(D) graphically shows an ideal dynamic characteristic line according to the present invention.

In FIG. 5(D), at the points A, B and C, $$PC = \frac{K}{A_2} + \frac{F_S + (D - x) \times S_C \times S_R \times Z}{A_2}, \text{ and}$$

$$F_2 = (D - x) \times S_C \times S_R \times Z.$$

Wherein $A_1$ is an upper surface of the piston, $A_2$ is a lower surface of the piston, $F_1$ is the load pressure, $F_2$ is the force, (D-x) relates to the $F_2$ value, $S_R$ is the spring rate, and Z is the coefficient of efficiency of the bracket 33.

Accordingly, in the present invention, the ideal PC value is gained by manually controlling the spring ratio $S_c$ as shown in FIG. 4(D). That is, as shown in FIG. 1, the adjusting spring 9 includes a collar 14 fixed to around one end side thereof, a second female screw 15 is rotatably connected to the collar 14 wherein the collar 14 is inserted into the one end side of the second female screw 15, and a second male screw 16 screwed with the second female screw 15. The male screw 16 is annularly formed around one end side of a spring arm 17 which is resiliently linked and connected to a fixing arm 18 of an axle face 14 (FIG. 2) so as to control the length of the spring arm by screwing the second female screw 15.

In this situation, a value of the force $F_2$ is determined by a distance X of the center of the arm shaft 10 and the center of the valve stem 8, and a distance Y of the center of the arm shaft 10 and the center of the fixing arm 18 of the axle face 13.

In the control, upon rotating the handle 4, the load sensing reducing valve 31 is moved in the left or right side direction. Thereafter, upon rotating the valve stem 8, the center of the valve stem 8 is matched with the center of the piston 7. At that time, the value of the distance X is automatically adjusted. And, upon rotating the second female screw 15, the value of the distance Y is automatically adjusted.

Accordingly, if the distance Y is longer, the value of the force $F_2$ is little, and in the contrary, if the distance X is longer, the value of the force $F_2$ is big. Thus, in the different loading sources, if the distances X and Y are adjusted, the opening time of the ball valve 42 is almost the same as the points A, B and C on which the real braking line and the ideal braking curved line are crossed. Furthermore, the braking lines PC-KERB, PC-GUW, PC-O/L on the load sensing reducing valve 31 can be changed to the dynamic characteristics which is the same as the ideal braking curved line of the empty car (KERB), the loaded car (GUW) and the surplus loaded car (O/L), whereby the pressure reducing valve device can eliminate the locking problem of the rear brake and reduce the increase of the pedal operation.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A pressure reducing valve device for a vehicle, comprising:

a load sensing reducing valve movable in a horizontal direction on a bracket by controlling a first screw member;

an adjusting spring adjustable in its length by controlling a second screw member; and a valve stem operatively connected to a rotary arm which is rotatably connected to an arm shaft fixed to one end of said adjusting spring for aligning with a piston of said load sensing reducing valve by controlling a third screw member, whereby the pressure reducing valve device controls a fluctuating width of dynamic characteristics so as to match with an ideal braking line of any one of an empty, loaded and surplus loaded vehicle by reducing the locking of the rear brake and an increased pedal operation.

2. The pressure reducing valve device of claim 1, wherein the first screw member includes a first female screw welded to said bracket, a first male screw threaded with the first female screw, and a pair of male screw seats extending from both sides of said bracket for seating the first male screw, the first male screw having a handle attached to one end thereof, whereby upon rotating the handle, a piston of the load sensing reducing valve moves.

3. The pressure reducing valve device of claim 1, wherein the second screw member includes a second female screw connected to a collar which is attached to the other end of said adjusting spring, and a second male screw threaded with the second female screw, the second male screw extending from a spring arm which is linked to a fixing arm of an axle face, whereby upon rotating the second female screw, the length of the adjusting spring is correspondingly adjusted.

4. The pressure reducing valve device of claim 1, wherein the third screw member includes a third female screw formed within said rotary arm, and a third male screw threaded with the female screw and attached to the valve stem, whereby upon rotating the valve stem, the distance of the arm shaft and the valve stem is adjusted so as to align the center of the valve stem with the piston of the load sensing pressure valve.

\* \* \* \* \*